US010927878B2

United States Patent
Rothgeb, Jr.

(10) Patent No.: US 10,927,878 B2
(45) Date of Patent: Feb. 23, 2021

(54) QUICK FASTENER

(71) Applicant: James R. Rothgeb, Jr., Jupiter, FL (US)

(72) Inventor: James R. Rothgeb, Jr., Jupiter, FL (US)

(*) Notice: Subject to any disclaimer, the term of this patent is extended or adjusted under 35 U.S.C. 154(b) by 226 days.

(21) Appl. No.: 15/901,678

(22) Filed: Feb. 21, 2018

(65) Prior Publication Data

US 2018/0238375 A1 Aug. 23, 2018

Related U.S. Application Data

(60) Provisional application No. 62/462,785, filed on Feb. 23, 2017.

(51) Int. Cl.
*F16B 37/08* (2006.01)
*F16B 5/02* (2006.01)
*E06B 9/00* (2006.01)
*E06B 9/02* (2006.01)

(52) U.S. Cl.
CPC ........ *F16B 37/0814* (2013.01); *F16B 5/0275* (2013.01); *E06B 9/02* (2013.01); *E06B 2009/005* (2013.01); *F16B 37/08* (2013.01)

(58) Field of Classification Search
CPC ........ F16B 5/0275; F16B 37/00; F16B 37/08; F16B 37/0814; E04B 9/02; E04B 2009/005
USPC .......................................... 411/427, 436, 437
See application file for complete search history.

(56) References Cited

U.S. PATENT DOCUMENTS

| | | | | |
|---|---|---|---|---|
| 413,316 A | * | 10/1889 | Dobson | B23B 51/107 408/201 |
| 1,008,145 A | * | 11/1911 | Heeter | B42F 13/12 402/63 |
| 2,066,541 A | * | 1/1937 | Schenk | B25B 5/10 411/437 |
| 2,261,537 A | * | 11/1941 | Zamarra | B43L 9/22 74/424.78 |
| 3,757,591 A | * | 9/1973 | Taylor | F16H 25/20 74/424.78 |
| 3,878,757 A | * | 4/1975 | Puklus, Jr. | F16B 37/0814 411/433 |
| 5,558,481 A | * | 9/1996 | Park | F16B 37/0814 411/432 |
| 10,018,216 B1 | * | 7/2018 | Espinosa | F16B 37/0814 |
| 10,328,510 B2 | * | 6/2019 | Yamaguchi | B23H 7/08 |
| 10,334,997 B2 | * | 7/2019 | Yocom | A47K 10/3836 |

(Continued)

OTHER PUBLICATIONS

Anonymous, https://www.berger-tools.co.uk/Gn63031_Quick_Release_Knurled_Nut_Steel_Blackened, retrieved from Internet Jul. 12, 2018.

*Primary Examiner* — Roberta S Delisle
(74) *Attorney, Agent, or Firm* — McHale & Slavin, P.A.

(57) ABSTRACT

A quick release fastener. The quick release fastener comprises a first end, a second, opposing end, and a main body therebetween. The main body comprises an internal lumen or passageway having a plurality of guiding surfaces and securing surfaces. The securing surfaces are preferably angled surfaces. The angled orientation provides a securing member insertion axis (which also forms the longitudinal axis) and a securing member securing axis; each axis forming a separate plane to allow the quick release fastener to quickly and easily traverse between a locked position and an unlocked position.

18 Claims, 4 Drawing Sheets

(56) References Cited

U.S. PATENT DOCUMENTS

| | | | |
|---|---|---|---|
| 2011/0091299 A1* | 4/2011 | Weng | B29C 66/5344 |
| | | | 411/427 |
| 2012/0315778 A1* | 12/2012 | Leifer | H01F 38/30 |
| | | | 439/253 |
| 2018/0264572 A1* | 9/2018 | Yamaguchi | B23H 7/08 |

* cited by examiner

QUICK FASTENER

CROSS-REFERENCE

In accordance with 37 C.F.R. 1.76, a claim of priority is included in an Application Data Sheet filed concurrently herewith. Accordingly, the present invention claims priority under 35 U.S.C. § 119(e) to U.S. Provisional Application 62/462,785 entitled "QUICK FASTENER", filed on Feb. 23, 2017. The contents of the above referenced application are herein incorporated by reference in its entirety.

FIELD OF THE INVENTION

The present invention relates to a quick release fastener; to a quick release fastener for securing shutters; and more particularly, to a quick release fastener for quickly installing and removing shutters from a portion of a building surface, such as a door or window, to prevent damage from an impending storm or natural disaster.

BACKGROUND OF THE INVENTION

In areas prone to severe storms, such as hurricanes, proper equipment for protecting portions of structures prone to damage is essential. The most common form of protective equipment is storm shutters. Storm shutters have the benefit of being able to protect windows and doors from extremely high winds and flying debris. Storm shutters also have the benefit of being removable, and therefore, are not required to remain secured to the building during non-storm periods. While such a feature may provide an aesthetic benefit, storm shutter installation can be difficult to perform and time consuming. Typical installation requires the use of wing nuts and mechanical fasteners in order to properly secure each shutter to a window or door. These mechanical fasteners are generally a number of threaded rods, each requiring manual installation to secure the shutters properly. Moreover, quite a bit of effort is required to remove them when the danger has passed.

While storm shutters properly secured in place protect the structure's doors or windows from damage, there is a threat to the individuals inside. Individuals requiring quick escape from the building because of an internal emergency, i.e. a fire within the structure while the shutters are secured in place, face a difficult pathway out. In many cases, these individuals are trapped inside as they are unable to remove the fasteners from the inside. In addition, emergency rescue personnel lose valuable time in trying to remove the secured shutters in order to enter the building.

A quick release fastener for quickly installing and removing shutters from a portion of a building surface, such as a door or window, is needed.

SUMMARY OF THE INVENTION

The present invention provides for a quick release fastener that secures a shutter, preferably a hurricane shutter or hurricane panel, to a portion of a building (such as a window or door) susceptible to severe weather damage. While providing a mechanism to securely fasten the shutter to the door or window, the quick fastener is designed to be removed easily, quickly, and without the requirement of sophisticated or power tools. While the quick release fastener is primary described for use with or in the shutter field, such illustrative description is not intended to limit the use or applicability to such field. The quick release fastener in accordance with the present invention may be used to fasten or secure two or more units, objects, or components together.

In an illustrative embodiment, a quick release fastener to fasten or secure two or more objects together may comprise: a first end; a second end; and a main body extending between the first end and the second end. The quick release fastener may be traversable between a locking position and a non-locking position. The main body may have an internal passageway sized and shaped to receive a shaft and extending the entire length of the main body. The internal passageway may have two opposing securing surfaces configured to engage with at least two different portions of a shaft when in a locking position, the opposing securing surfaces oriented about or along a longitudinal axis in opposing orientations. The quick release fastener main body may comprise a securing member mounting axis and a securing member securing axis. The securing member mounting axis and the securing member securing axis may be formed on two different planes, wherein when the internal passageway is mounted onto or engages with a shaft, rotation of the quick release fastener in a clockwise or counterclockwise rotation orientates securing to the shaft along either axis depending on rotation direction.

In another embodiment, a quick release fastener may comprise: a fastening body rotatable to traverse between a locked position and an unlocked position and having a first end and an opposing second end, the fastening body having an internal passageway sized and shaped to receive one or more portions of a shaft of a securing member; the internal passageway has a first end portion which terminates in a first end opening, and a second end portion which terminates in a second end opening; the internal passageway first end portion comprises a first guiding surface configured for guiding the internal passageway along or about a securing member shaft, and a first securing angled surface; the internal passageway second end portion comprises a second guiding surface configured for guiding the internal passageway along or about a securing member shaft, and a second securing angled surface; the first securing angled surface and the second securing angled surface are orientated to diverge away from and in opposite directions relative to a longitudinal axis; wherein rotation of the fastening body to a locked position orientates the first securing angled surface and the second securing angled surface about or along the shaft of the securing member to lock the quick release fastener in place.

Accordingly, it is an objective of the invention to provide a quick release fastener.

It is a further objective of the invention to provide a quick release fastener for fastening or securing two or more units, objects, or components together.

It is a further objective of the invention to provide a quick release fastener for quickly installing and removing shutters from a portion of a building surface, such as a door or window, to prevent damage from an impending storm or natural disaster.

It is a further objective of the invention to provide a quick release fastener which can quickly and easily traverse between a locked position and an unlocked position.

It is yet another objective of the instant invention to provide a quick release fastener which contains a securing member insertion axis (which also forms the longitudinal axis) and a securing member securing axis.

It is a still further objective of the invention to provide a quick release fastener which has a pair of opposing, angled surfaces for securing a securing device, such as a threaded rod.

It is yet another objective of the invention to provide a quick release fastener comprising a securing member insertion axis (which also forms the longitudinal axis) which has a different orientation than a securing member securing axis.

Other objectives and advantages of this invention will become apparent from the following description taken in conjunction with any accompanying drawings wherein are set forth, by way of illustration and example, certain embodiments of this invention. Any drawings contained herein constitute a part of this specification, include exemplary embodiments of the present invention, and illustrate various objects and features thereof.

DETAILED DESCRIPTION OF THE INVENTION

Figure 1:
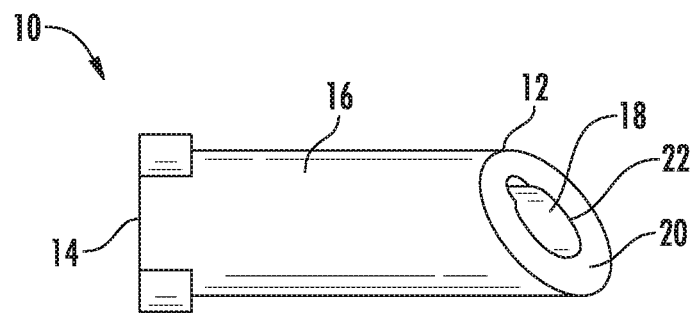
FIG. 1 is a side perspective view of an illustrative example of a quick release fastener.

While the present invention is susceptible of embodiment in various forms, there is shown in the drawings and will hereinafter be described a presently preferred, albeit not limiting, embodiment with the understanding that the present disclosure is to be considered an exemplification of the present invention and is not intended to limit the invention to the specific embodiments illustrated.

Figure 2:
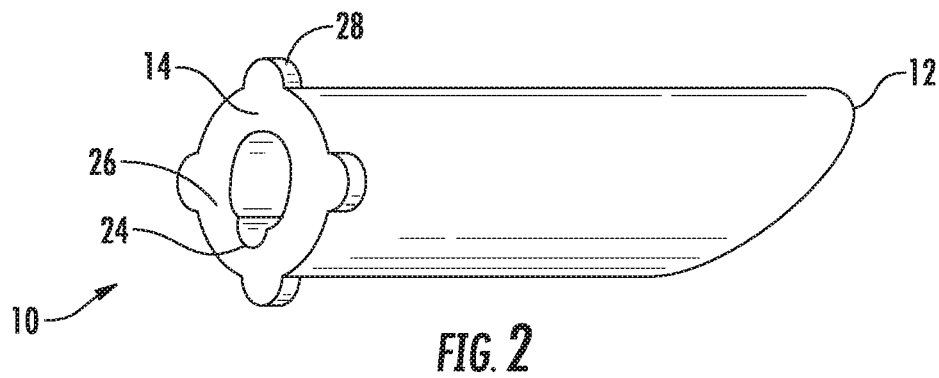
FIG. 2 is an alternative side perspective view of the quick release fastener illustrated in FIG. 1.
Figure 3:
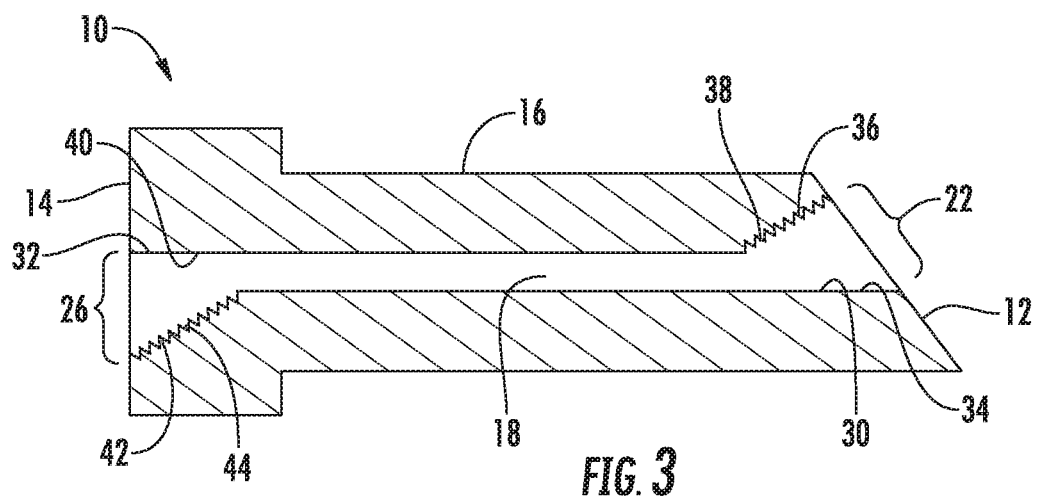
FIG. 3 is a cross sectional view of an illustrative embodiment of an internal passageway positioned within the interior of the quick release fastener.

An illustrative example of a fastener, referred to generally as a quick release fastener 10, is shown in FIGS. 1 and 2. The quick release fastener 10 comprises a first end 12, a second, opposing end 14, and a main body 16 therebetween. The main body 16 comprises an internal lumen or passageway 18. As shown in FIG. 3, the internal passageway 18 preferably has a length that runs the entire length of the main body 16, from the first end 12 to the second end 14. The first end 12 of the main body 16 comprises an angled or slanted surface 20 with a first end opening 22. The second end 14 of the main body 16 has a generally planar surface 24 with a second opening 26. The second end 14 of the main body 16 may also contain one or more structures, illustrated herein as a semi-circular knob-like structure 28, extending outwardly from the main body 16. The semi-circular knob-like structures 28 provide a mechanism for the user to lock or unlock the quick release fastener 10. For example, a user can rotate the quick release fastener 10 in a clockwise or counterclockwise direction using the semi-circular knob-like structures 28 to rotate the main body 16 in a locking position or orientation, or an unlocking position or orientation.

Figure 4:
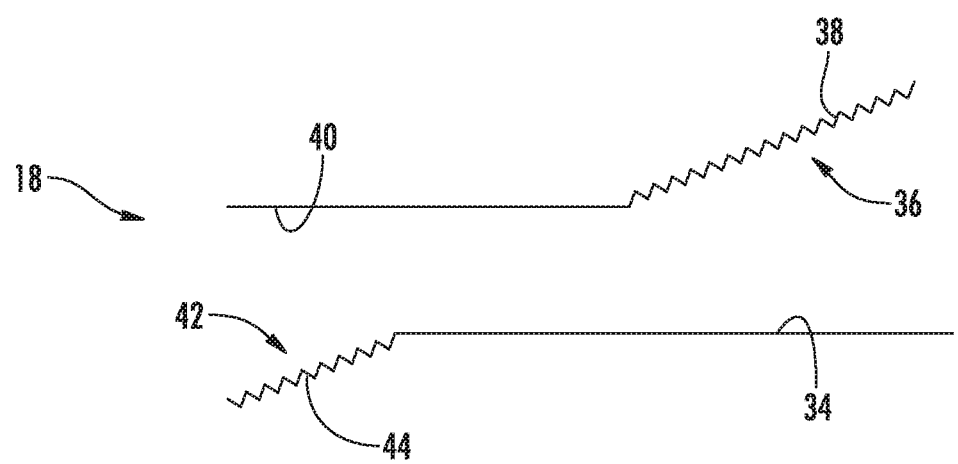
FIG. 4 is a schematic cross sectional view of the quick release fastener, illustrating a securing member insertion axis and a securing member securing axis.

The internal passageway 18 is sized and shaped to be mounted onto and secured to a securing device, such as a threaded rod. Referring to FIGS. 3 and 4, the internal passageway 18 has a first end portion 30 which terminates at the main body first end opening 22 and a second end portion 32 which terminates at the main body second end opening 26. The internal passageway first end portion comprises a first guiding surface (for guiding the internal passageway 18 along a securing member, i.e. a threaded rod, when first mounted) and a first securing surface 36. The first guiding surface 34 is preferably a generally planar surface. The first securing surface 36 is preferably an angled surface (relative to the guiding surface 34) with a securing mechanism, illustrated herein as threading sized and shaped to correspond with the threading of a securing device such as the threaded rod.

The internal passageway second end portion 32 comprises a second guiding surface 40 and a second securing surface 42. The second guiding surface 40 is preferably a generally planar surface. The second securing surface 42 is preferably an angled surface (relative to the guiding surface 40) with a securing mechanism, illustrated herein as threading sized and shaped to correspond with the threading of a securing device such as a threaded rod. In this arrangement, the internal passage 18 provides a mechanism which allows the quick release fastener 10 to be placed in a locked position or an unlocked position.

Figure 5:
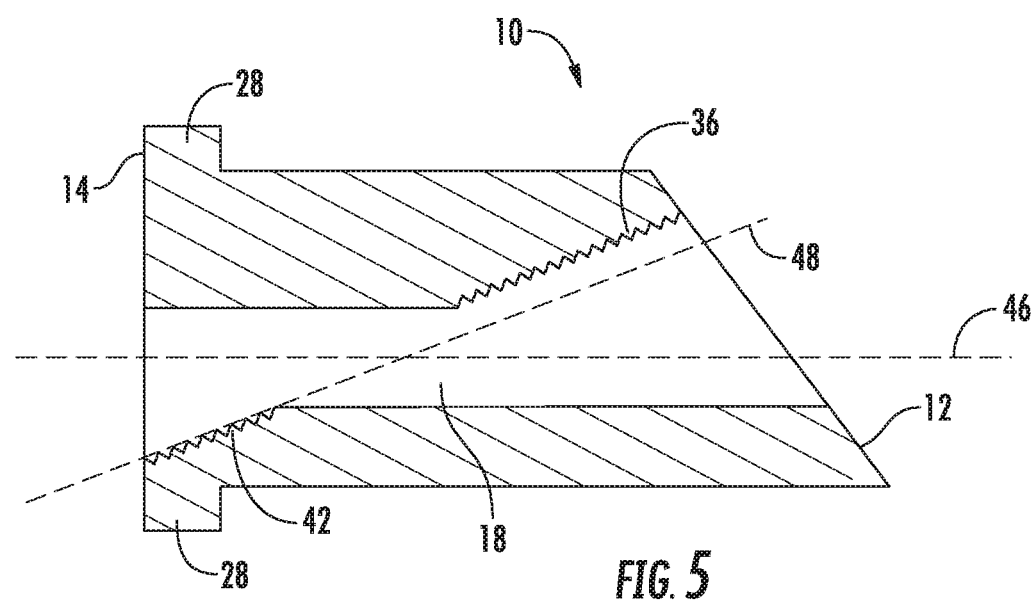
FIG. 5 is a schematic illustration of the arrangement of the securing segment of the internal passageway.

Referring to FIG. 5, the quick release fastener 10 is shown with a securing member mounting axis 46 (which also forms the longitudinal axis) and a securing member securing axis 48. As illustrated, the securing member mounting axis 46 and the securing member securing axis 48 are formed on two different planes so that, when the internal passageway 18 is mounted onto the securing device such as a threaded rod, rotation of the quick release fastener 10 in a clockwise or counterclockwise rotation orientates the securing along either axis. Both angled surfaces, 36 and 42, are oriented to diverge away from the securing member mounting axis 46 (or the longitudinal axis).

Figure 6:
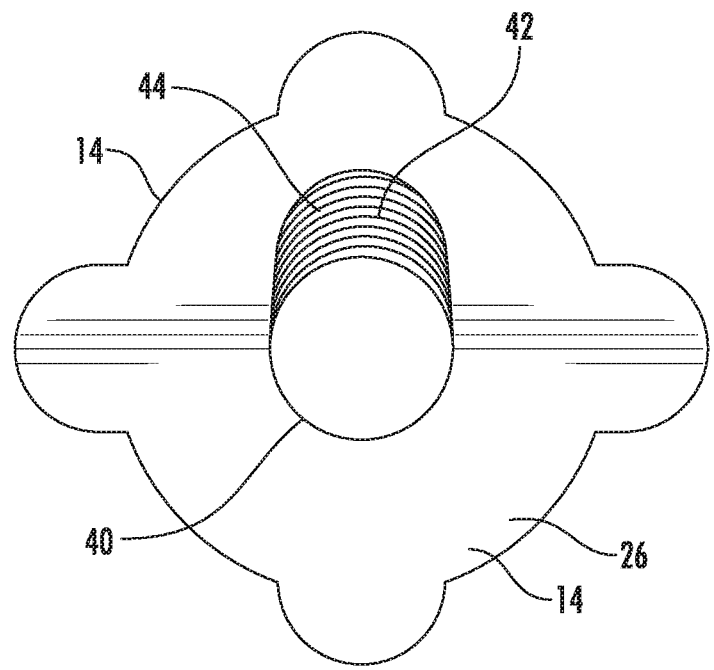
FIG. 6 is a first end view of the quick release fastener illustrated in FIG. 1.
Figure 7:
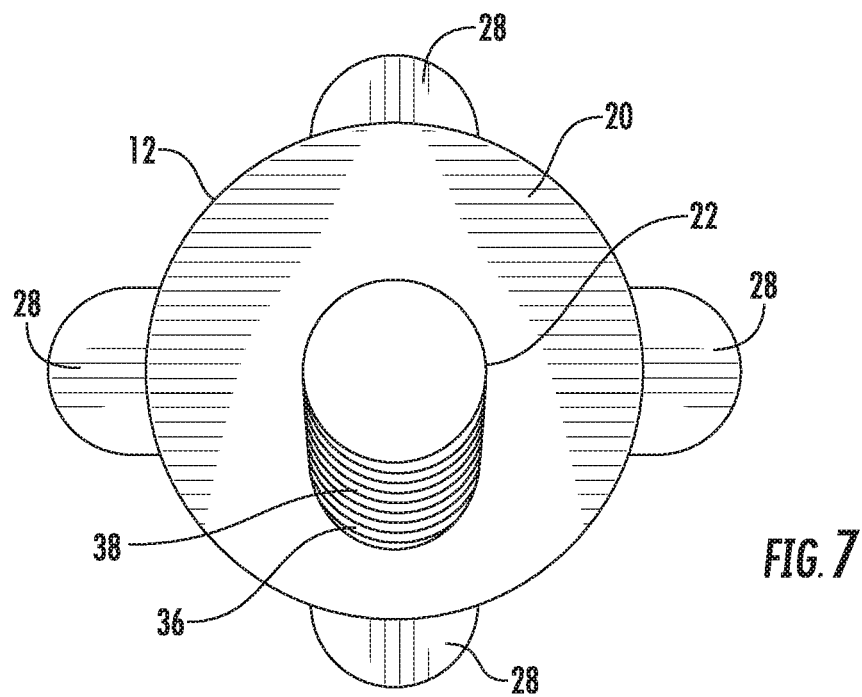
FIG. 7 is a second end view of the quick release fastener illustrated in FIG. 1.

FIG. 6 illustrates a first end view, showing the first end 12 of the quick release fastener 10. The first securing surface 36 is shown angled in a downward position. The first securing surface 36 is also illustrated as having a smaller diameter than the first guiding surface 34. FIG. 7 is a second end view showing the second end 14 of the quick release fastener 10. The second securing surface 42 is shown angled in an upward position. The second securing surface 42 is also illustrated as having a smaller diameter than the second guiding surface 40.

Figure 8:
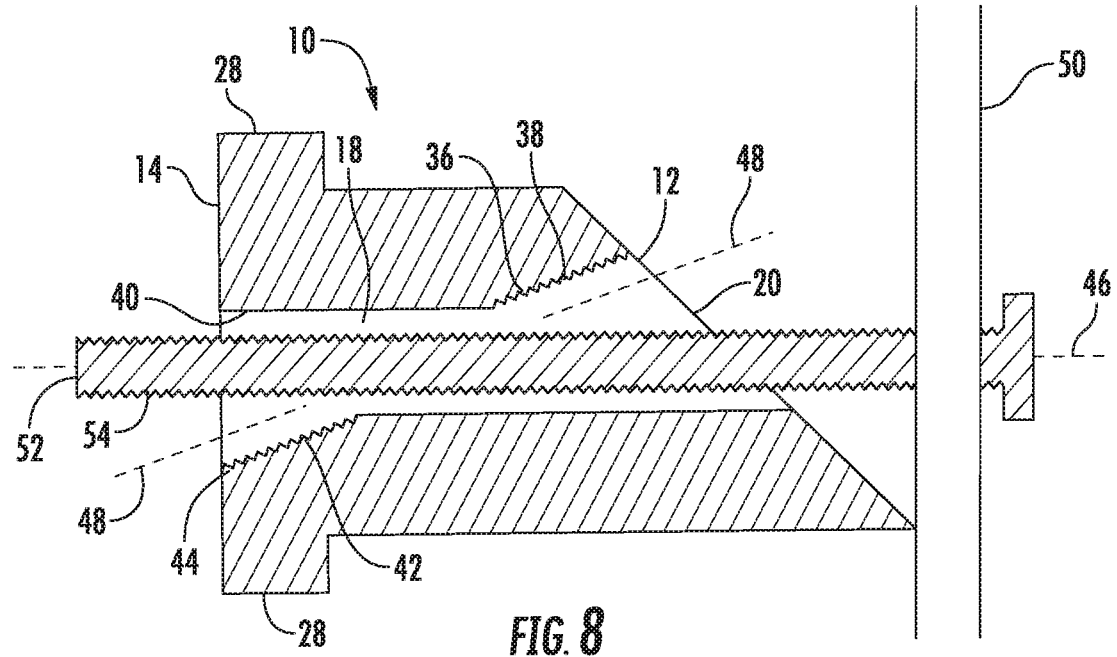
FIG. 8 illustrates the quick release fastener mounted onto the threaded rod, in the insertion position.
Figure 9:
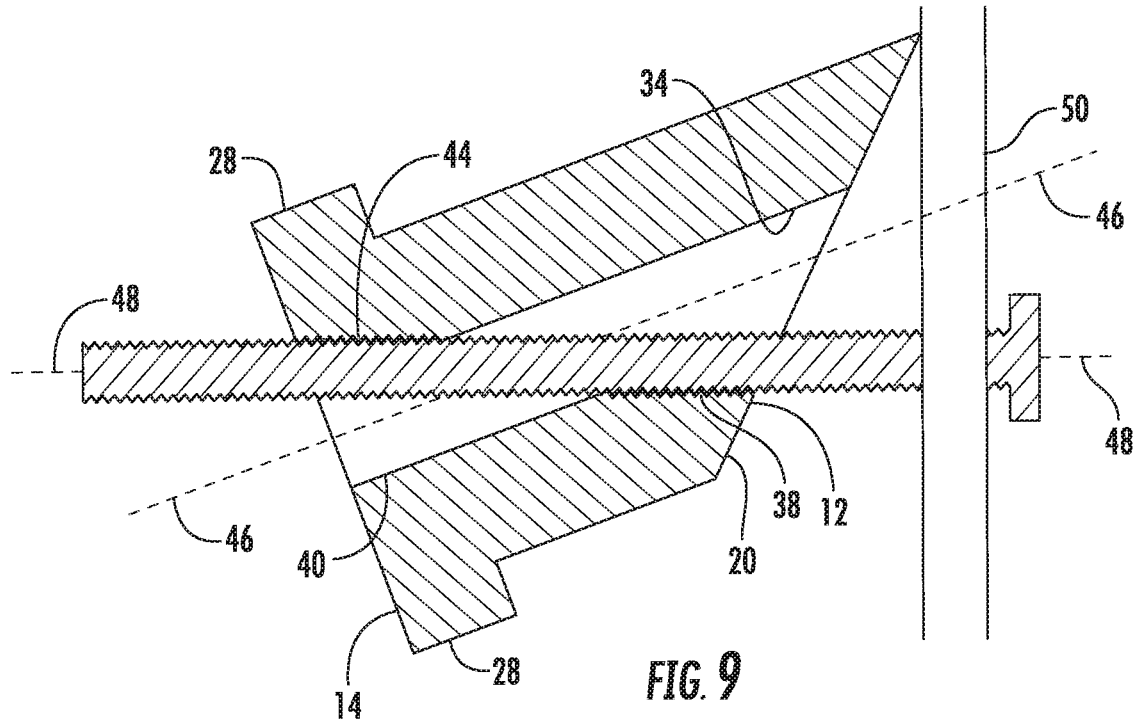
FIG. 9 illustrates the quick release fastener mounted onto the threaded rod, in the securing position.

FIG. 8 illustrates the quick release fastener 10 engaged with a hurricane shutter 50 in the insertion position. FIG. 9 illustrates the quick release fastener engaged with a hurricane shutter 50 in a locked position. The internal passageway 18 is mounted to a threaded rod 52 with threading 54, resting in the insertion position. Threaded rod 52 rests within the internal passageway 18 so as to be parallel or in alignment with the securing member mounting axis 46. The quick release fastener 10 is not in a locked position because none of the first and second securing portion threading 38 and 44 is engaged with the threading 54 of threaded rod 52. While this allows the internal passageway 18 to move about the threaded rod 52, nothing prevents the quick release fastener 10 from being locked in place. As the quick release fastener 10 is rotated, the threading 54 of the threaded rod 52 engages the first and second securing portion threading 38 and 44. This locks the quick release fastener 10. The quick release fastener first end 12 is shown not flush with the shutter 50 in FIG. 8 or FIG. 9 for illustrative purposes. It is preferred that, when engaged with the shutter 50, the angled or slanted surface 20 of the quick release fastener first end 12 is flush with the shutter 50. While FIGS. 8 and 9 illustrate the shutter engaged with the quick release fastener 10, in use, the shutter 50 rests against a surface. The surface typically is a flat wall, but sometimes may be a rail. The resistance that holds the quick release fastener 10 in place, once the securing surfaces are engaged, is the wall/rail located behind the shutter 50.

All patents and publications mentioned in this specification are indicative of the levels of those skilled in the art to which the invention pertains. All patents and publications are herein incorporated by reference to the same extent as if each individual publication was specifically and individually indicated to be incorporated by reference.

It is to be understood that while a certain form of the invention is illustrated, it is not to be limited to the specific form or arrangement herein described and shown. It will be apparent to those skilled in the art that various changes may be made without departing from the scope of the invention, and the invention is not to be considered limited to what is shown and described in the specification and any drawings/figures included herein.

One skilled in the art will readily appreciate that the present invention is well adapted to carry out the objectives and obtain the ends and advantages mentioned, as well as those inherent therein. The embodiments, methods, procedures and techniques described herein are presently representative of the preferred embodiments, are intended to be exemplary, and are not intended as limitations on the scope. Changes therein and other uses will occur to those skilled in the art which are encompassed within the spirit of the invention and are defined by the scope of the appended claims. Although the invention has been described in connection with specific preferred embodiments, it should be understood that the invention as claimed should not be unduly limited to such specific embodiments. Indeed, various modifications of the described modes for carrying out the invention which are obvious to those skilled in the art are intended to be within the scope of the following claims.

What is claimed is:

1. A quick release fastener to fasten or secure two or more objects together comprising:
    a first end comprising an angled surface relative to a longitudinal axis of said quick release fastener, said angle sufficient to allow said first end to be flush with a surface it secures thereto;
    a second end comprising a surface which is generally perpendicular to said longitudinal axis; and
    a main body extending between said first end and said second end and traversable between a locking position and a non-locking position, said main body having an internal passageway sized and shaped to receive a shaft and extending an entire length of said main body, said internal passageway having two opposing securing surfaces configured to engage with at least two different portions of said shaft when in said locking position, said two opposing securing surfaces oriented about said longitudinal axis in opposing orientations.

2. The quick release fastener to fasten or secure two or more objects together according to claim 1, wherein said main body comprises a securing member mounting axis and a securing member securing axis, wherein said securing member mounting axis and said securing member securing axis are formed on two different planes, wherein when said main body is mounted onto said shaft, rotation of said quick release fastener in a clockwise or counterclockwise rotation orientates said main body about said shaft along either axis.

3. The quick release fastener to fasten or secure two or more objects together according to claim 2, wherein said internal passageway has a first end portion which terminates in a main body first end opening, and a second end portion which terminates in a main body second end opening.

4. The quick release fastener to fasten or secure two or more objects together according to claim 3, wherein said internal passageway first end portion comprises a first guiding surface configured for guiding said internal passageway along or about said shaft, and a first securing surface.

5. The quick release fastener to fasten or secure two or more objects together according to claim 4, wherein said first guiding surface is a generally planar surface.

6. The quick release fastener to fasten or secure two or more objects together according to claim 5, wherein said first securing surface is an angled surface.

7. The quick release fastener to fasten or secure two or more objects together according to claim 4, wherein said first securing surface comprises threading.

8. The quick release fastener to fasten or secure two or more objects together according to claim 4, wherein said internal passageway second end portion comprises a second guiding surface configured for guiding said internal passageway along or about said shaft, and a second securing surface.

9. The quick release fastener to fasten or secure two or more objects together according to claim 8, wherein said second guiding surface is a generally planar surface.

10. The quick release fastener to fasten or secure two or more objects together according to claim 9, wherein said second securing surface is an angled surface.

11. The quick release fastener to fasten or secure two or more objects together according to claim 8, wherein said second securing surface comprises threading.

12. The quick release fastener to fasten or secure two or more objects together according to claim 8, wherein said first securing surface and said second securing surface are orientated to diverge away from said securing member mounting axis or said longitudinal axis.

13. The quick release fastener to fasten or secure two or more objects together according to claim 12, wherein said first securing surface and said second securing surface diverge in opposite directions, away from said, securing member mounting axis or said longitudinal axis.

14. The quick release fastener to fasten or secure two or more objects together according to claim 8, wherein,
    said first securing surface has a smaller diameter than a diameter of said first guiding surface; and
    said second securing surface has a smaller diameter than a diameter of said second guiding surface.

15. The quick release fastener to fasten or secure two or more objects together according to claim 2, wherein said securing member mounting axis and said securing member securing axis are formed on two different planes, wherein when said internal passageway is mounted onto or engages with said shaft, rotation of said quick release fastener in a clockwise or counterclockwise rotation orientates securing to said shaft along either axis depending on rotation direction.

16. The quick release fastener to fasten or secure two or more objects together according to claim 2, wherein said second end further contains one or more structures which extend in a direction away from said main body.

17. The quick release fastener to fasten or secure two or more objects together according to claim 16, wherein said one or more structures which extend in a direction away from said main body are arranged about a perimeter of said second end.

18. A quick release fastener to fasten or secure two or more objects together comprising:
- a fastening body rotatable to traverse between a locked position and an unlocked position and having a first end comprising a surface which is slanted relative to a longitudinal axis and an opposing second end comprising a surface which is generally perpendicular to said longitudinal axis, said fastening body having an internal passageway sized and shaped to receive one or more portions of a shaft of a securing member;
- said internal passageway has a first end portion which terminates in a first end opening, and a second end portion which terminates in a second end opening,
- said internal passageway first end portion comprises a first guiding surface configured for guiding said internal passageway along or about a securing member shaft, and a first securing angled surface;
- said internal passageway second end portion comprises a second guiding surface configured for guiding said internal passageway along or about a securing member shaft, and a second securing angled surface;
- said first securing angled surface and said second securing angled surface are orientated to diverge away from and in opposite directions relative to said longitudinal axis;
- wherein rotation of said fastening body to a locked position orientates said first securing angled surface and said second securing angled surface about said shaft of said securing member to lock said quick release fastener in place.

* * * * *